March 24, 1925.
E. L. SCHUMACHER ET AL
1,531,141
OPHTHALMIC MOUNTING
Filed April 10, 1922
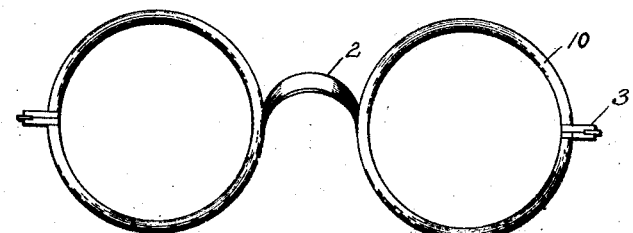
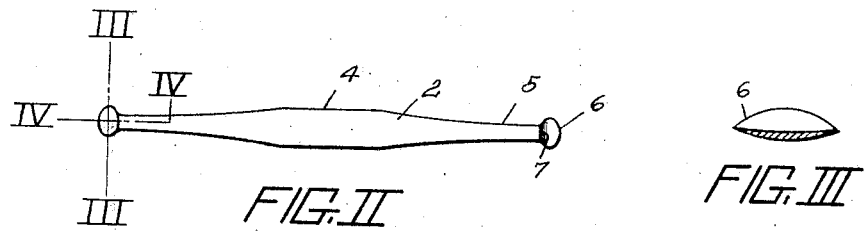
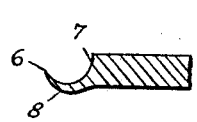 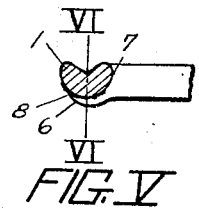
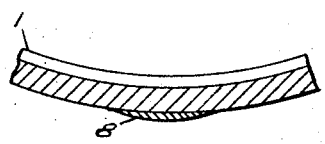 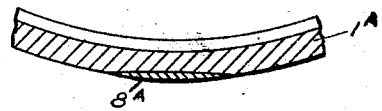
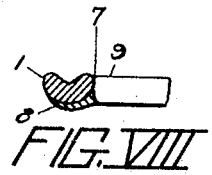
INVENTORS
E. L. SCHUMACHER
BY L. POETON
ATTORNEYS Patented Mar. 24, 1925.

1,531,141

UNITED STATES PATENT OFFICE.

ELMER L. SCHUMACHER AND LAWRENCE POETON, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed April 10, 1922. Serial No. 551,178.

*To all whom it may concern:*

Be it known that we, ELMER L. SCHUMACHER and LAWRENCE POETON, citizens of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings and more particularly to the construction of spectacle frames. The main object of the present invention is the provision of a new and improved method for connecting the ends of the bridge of the spectacle frame to the eye wires whereby the ends of the bridge will be securely attached to the eye wires and, at the same time, retain the proper degree of stiffness and elasticity so as to prevent any separation between the bridge and the eye wire.

Another object of the invention is the provision of a suitable connection between the nose bridge and the eye wires whereby after the ends of the bridge have been connected to the eye wires and swaged or finished down there will be a projection portion of the ends of the bridge which will extend beyond the exterior of the eye wire so that when a non-metallic frame is arranged in position the projecting portion will extend into the groove of the non-metallic rim and assist in retaining this non-metallic rim in position upon the metal eye wire.

A further object of the invention is the provision of an improved connection between the nose piece and the eye wires which includes the forming of what is known as fan ends at the ends of the nose bridge placing the grooved eye wire within each of these fan ends and soldering the same in place, and then swaging the soldered portion which will not only retain the eye wire groove but will smooth the soldered portion down and tend to re-shape the ends of the nose bridge which might have become distorted during the soldering process.

With the above and other objects in view the invention consists in the novel features of construction, the combination and arrangement of parts hereinafter more fully set forth, pointed out in the claims and shown in the accompanying drawings, in which—

Figure I is a front elevation of a spectacle frame constructed in accordance with my invention.

Figure II is a plan view of a bridge member illustrating the form of the same prior to attaching the bridge member to the eye wires.

Figure III is a transverse sectional view taken on the line III—III of Figure II.

Figure IV is a detailed longitudinal sectional view taken on the line IV—IV of Figure II.

Figure V is a cross sectional view of the eye wire showing the same after being soldered onto the nose bridge.

Figure VI is a sectional view taken on the line VI—VI of Figure V.

Figure VII is a sectional view of a portion of the eye wire with a depression or slight countersink therein showing the fan-shaped end of the nose bridge swaged and smoothed off into the depression.

Figure VIII is a sectional view of one end of the nose bridge shown in Figure VII, also showing how it is swaged, smoothed off and connected to the eye wire which is shown in section.

Referring now more particularly to the drawings 1 indicates the eye wires of a spectacle mounting suitably connected by means of the nose bridge 2 and having the usual end pieces 3 attached thereto.

In the construction of the improved frame the bridge member 2 is formed with a reinforced or enlarged central member 4 reduced at its ends as shown at 5 and then pressed into cup shape elliptical fans or ends 6, the forming of said fans producing an abutting end piece 7 while the exterior or outer curved portion of each elliptical fan extends beyond one face of the bridge member or nose bridge as shown at 8.

The bridge member 2 is secured to the eye wires 1 by fitting the curved fans 6 over the rounded exterior surface of the eye wire and soldering or otherwise securing the fans to the eye wires.

In Figure V I have illustrated the relative position of the parts after being soldered together and it will be noted that the exterior of the fan 6 and the solder form a very rough and uneven surface on the outer surface of the eye wire and attention is called to the fact that when heating these parts for soldering the same together the stiffness of the eye wire and the ends of the nose bridge are reduced considerably producing considerable elasticity and in order to bring back the original stiffness of these parts and form a strengthened joint at the connection between the ends of the bridge and eye wire these parts are put thru a swaging operation which not only retains the groove in the eye wire, but removes the roughened surface caused by the soldering and tends to bring the ends of the nose bridge into tight fitting engagement with the sides of the eye wires, thus bringing the upper face of the nose bridge below the adjacent edge of the eye wire as illustrated in Figure VIII.

Attention is called to the fact that during the swaging process the ends of the nose bridge are reduced as shown at 9, being understood that this reduction does not take away from the strength of the bridge but merely shapes the same for better appearances. This improved frame is especially adapted for the fitting of non-metallic eye wire onto the metallic eye wires 1 and in order to assist in retaining these non-metallic eye wires in position it is preferred to have the ends of the nose bridge, which are attached to the eye wires project beyond the outer surface of the eye wires so as to be fitted within the groove of the non-metallic eye wires for retaining the same in position.

In Figure VII of the drawing, I have shown a slight modification of this invention, in which the numeral 1<sup>A</sup> designates a metallic eyewire in which a relatively shallow depression has been formed to receive the elliptical fan shaped end 8<sup>A</sup>, of the bridge 2. In this form of the invention the grooves in the eyewire are joined in exactly the same way as in the other form of this invention, differing only in the fact that there is a slight depression formed in the eyewire 1<sup>A</sup>, in order that the end 8<sup>A</sup>, of the bridge 2, may be flush with the outer periphery of the eyewire.

From the above description taken in connection with the accompanying drawings it will be apparent that I have provided an improved ophthalmic frame wherein the manner of connecting various parts of this frame tend to increase the strength and stiffness of the parts but at the same time retain the required amount of elasticity which will prevent them from becoming easily broken at the junction of the several parts. The construction of the frame, particularly with reference to the fastening of the nose bridge to the eye wire in the manner shown and described, causes a stop to be formed for the non-metallic rims 10, which are fitted over the eye wires 1, thereby retaining the non-metallic rims against lateral movement.

What is claimed is:

1. An ophthalmic frame including a lens rim and a nose bridge, each end of which abuts and engages with the side edge of the lens rim, said nose bridge beyond said abutting end having a broad elliptical fan fastened onto it and finished down and off on the surface of the lens rim, thereby eliminating projecting portions at the ends of the nose bridge.

2. An ophthalmic frame including a lens rim provided with a relatively broad depression which is relatively shallow, and a nose bridge, each end of which abuts and engages with the side edge of the lens rim, the extremity of the nose bridge beyond the abutting end terminating in a broad elliptical fan swagedly fastened in said depression and finished down and off onto the surface of the lens rim, thereby eliminating projecting portions at the ends of the nose bridge.

ELMER L. SCHUMACHER.
LAWRENCE POETON.